Sept. 15, 1964 D. D. SLITER 3,149,337

MEANS AND METHOD FOR PROVIDING CONTROLLED AIR BEARING SUPPORT FOR A MEMBER OVER A SMOOTH, REGULAR, MOVING SURFACE

Filed June 27, 1958 2 Sheets-Sheet 1

INVENTOR.
DONALD D. SLITER

BY Hansen and Lane

ATTORNEYS

Sept. 15, 1964 D. D. SLITER 3,149,337

MEANS AND METHOD FOR PROVIDING CONTROLLED AIR BEARING SUPPORT FOR A MEMBER OVER A SMOOTH, REGULAR, MOVING SURFACE

Filed June 27, 1958 2 Sheets-Sheet 2

INVENTOR.
DONALD D. SLITER
BY Hansen and Lane
ATTORNEYS

United States Patent Office 3,149,337
Patented Sept. 15, 1964

3,149,337

MEANS AND METHOD FOR PROVIDING CONTROLLED AIR BEARING SUPPORT FOR A MEMBER OVER A SMOOTH, REGULAR, MOVING SURFACE

Donald D. Sliter, San Jose, Calif., assignor to International Business Machines Corporation, New York, N.Y., a corporation of New York Filed June 27, 1958, Ser. No. 745,193
14 Claims. (Cl. 346—74)

The present invention relates to support means, and pertains more particularly to mechanism for providing controlled, air bearing support for an object over a relatively moving, smooth, regular surface, such as a magnetic transducer head over a magnetic disk record.

In the art of recording and playing back data by means of transducer heads mounted in operative proximity to a magnetic coated record member, an important problem is the securing of accurate, uniform, minimum spacing between the transducer and the magnetic recording surface of the record member. This problem becomes acute in electronic computer mechanisms, wherein the recorded data consists of magnetic data bits, since the closer and more uniformly a transducer can be mounted to a magnetic record surface without actually coming in contact with it, the higher the bit density of which the record is capable.

It is known that a rotating magnetic record disk, of the type commonly used in the random access files of electronic computing mechanisms, acts in a way like a centrifugal fan rotor in that, by frictional drag with the ambient air, it generates a laminar flow of air along its flat sides, such air moving in the combined direction of disk rotation and radially outwardly from the disk axis. In the past, some attempts have been made to use such air currents to provide air bearing support for a transducer head.

The present invention contemplates the provision of a transducer head support member of inverted aircraft wing sectional shape for mounting in the laminar air current generated by the rotation of a rotary record member, whereby such air current not only will provide air bearing support for a transducer mounted in the support member, but will also urge the support member toward the record by the negative lift of the inverted wing action of the support member.

Another object of the invention is to mount a transducer for relative tilting and vertical adjusting movement in a support member having the shape of an inverted aircraft wing section, which support member is adapted to be mounted within an air current generated by a rotating magnetic record member.

A further object of the invention is to mount a transducer in a support member of inverted wing section and within an air current generated by the rotation of a magnetic record disk, which support member is mounted for movement toward and away from such disk, but is retained against movement in the direction of disk movement past the support member.

A further object of the invention is to provide biased, resilient transducer support means normally retaining the transducer slightly spaced from a magnetic record surface when the record is starting and stopping, but which draws the transducer toward the record into uniformly spaced, closely juxtaposed relation therewith when the record is running at operative speeds.

A further object of the invention is to provide improved, biased, means for mounting a transducer in uniform, air-bearing supported, close proximity to a rotating record surface.

These, and other objects and advantages of the invention, will be apparent from the following description and the accompanying drawings, wherein.

Figure 1:
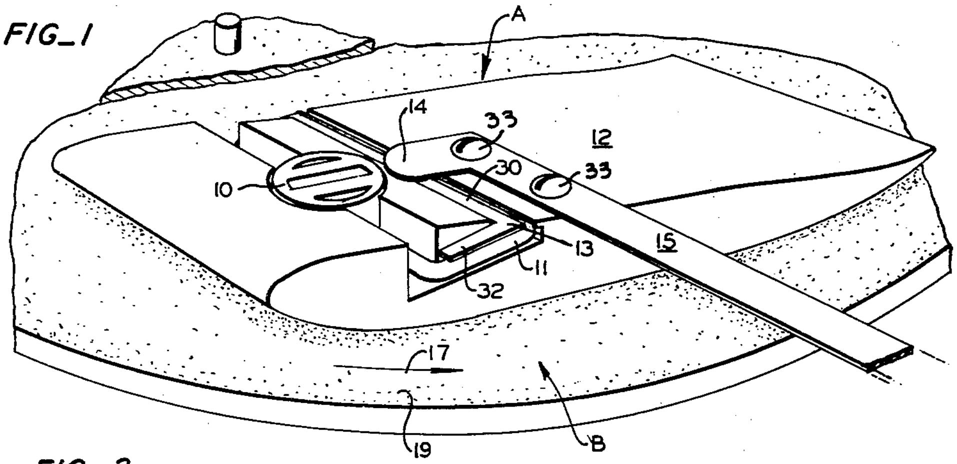
FIG. 1 is a fragmentary perspective view of a transducer support member embodying the invention, portions of the supporting arm and of the record disk being broken away.
Figure 2:
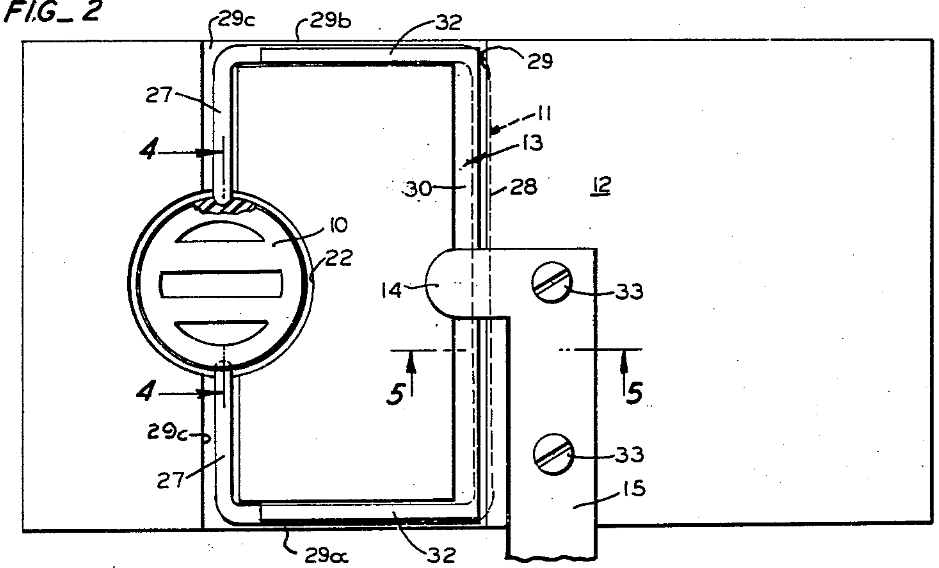
FIG. 2 is a plan view of the mechanism shown in FIG. 1, the record disk being omitted.
Figures 3, 5:
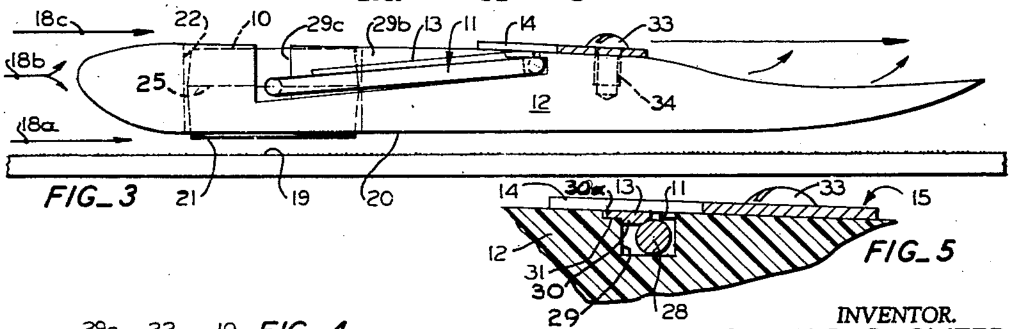
FIG. 3 is a side elevational view of the mechanism shown in FIG. 1, arrows indicating the direction of the disk-generated air flow past the support member.
FIG. 5 is an enlarged, fragmentary, sectional view taken along line 5—5 of FIG. 2.

Briefly, the form A of the invention illustrated in FIGS. 1–5 comprises a transducer head 10 of a well known type used for reading and writing data on a magnetic record surface, such as, for example, the well known type of record disk B. The transducer head 10 is mounted for vertical and universal tilting movement between the inwardly directed ends of a rectangular wire loop 11, journaled at its rear end on a support member 12. The latter is shaped, in longitudinal section, like an aircraft wing of unequal camber on the opposite sides thereof and designed to exert a lift effect toward the side thereof adjacent the record when said support member is positioned in the surface air current generated by the rotation of such record. The wire loop 11 is biased downwardly by a superposed U-shaped spring 13, held in place, as best shown in FIGS. 2 and 5, by a laterally extending tongue portion 14 of a spring band support arm 15.

When the record B is at rest, and during starting and stopping, the spring support arm 15 normally holds the support member A, and the transducer 10 mounted therein, in slightly spaced relation from the record B, which is rotatively driven in the direction of the arrow 17 (FIG. 1) by suitable drive means, such as a conventional electric motor, not shown. A current of air adjacent the disk B, and surrounding the support member A, is indicated by the arrows 18 in FIG. 3. This air current is generated by the drag of the surrounding air on the rotating disk, and, by wedge, or air bearing action, supports the wing shaped member 12 and the transducer head 10 clear of the magnetic record surface 19 as shown in FIG. 3. Additionally, however, the wing shape of the support member 12 is designed, in accordance with well known aerodynamic practice, to exert a lifting force urging the support member toward the magnetic record surface 19 when the support member is mounted with its leading edge directed into such record generated air current.

Referring to the drawings in detail, the record disk B may be of suitable material, such as, for example, plastic or aluminum, and the surfacing 19 is of suitable magnetic material, such as, for example, iron oxide. Such surfacing materials are well known, and may be applied to the record in any one of a number of well known ways, such as, for example, by spraying, plating, painting or otherwise.

The magnetic record surface 19 should be as smooth and true as is practicable, although the support member A and transducer head 10 are capable of following slight undulations and run-out in the record surface.

The support member 12 preferably is light in weight, and of suitable, non-magnetic material, such as, for example, plastic or light weight, non-magnetic metal. The support member 12 has a flat area 20 on its under side to provide air bearing support for the support member 12 on the current of air generated by the rotation of the disk B, and represented by the arrow 18*a* in FIG. 3. The illustrated support member 12 has the form of an inverted, high lift airfoil, with the flat under area 20 thereon, but may be modified as required in accordance with well known principles of airfoil design. As used herein the term "airfoil" is defined, in accordance with Webster's New World Dictionary, College Edition, 1956, as follows: "A part with a flat or curved surface made to be moved through the air so as to keep an aircraft up or control its movements; wing, rudder, etc. of an aircraft."

The transducer head 10 is of a well known type, with a flat, smooth under surface 21, and is of a size to fit freely into an opening 22 provided therefor in the support member 12. The peripheral wall of the transducer 10 is tapered radially inwardly at 23 and 24 on both sides of a medial plane, indicated by the line 25 in FIGS. 3 and 4, to permit slight, universal tilting adjustment of the transducer 10 relative to the support member 12.

Figure 4:
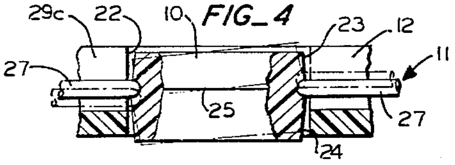
FIG. 4 is a fragmentary sectional view taken along line 4—4 of FIG. 2.

The transducer head 10 has swivel support between the inturned rear portions 27 and 28 of the rectangular wire loop 11, which may be of springy material, such as, for example, spring bronze or steel. The ends of the inturned loop portions 27 and 28 are rounded, as shown in FIGS. 2 and 4, and fit into correspondingly rounded recesses provided therefor in the sides of the transducer head 10. The latter is thus free for both vertical and universal tilting adjustment relative to the support member 12. Since the record surface over which the transducer 10 rides is very smooth, only a very slight tilting adjustment is ever required between the transducer 10 and the support member 12 in order to permit the transducer to follow any small undulations which may exist in the record surface.

The transversely extending rear portion 28 of the transducer mounting loop 11 is journaled in a transversely extending groove 29 provided therefor in the upper surface of the support member 12. Forwardly directed side extensions 29*a* and 29*b* and a transverse forward extension 29*c* of the groove 29 also are provided, and are deep enough to permit free downward swinging movement of the loop 11 sufficient to allow the transducer head 10 to project slightly below the flat under surface 20 of the support member 12.

The terms "up" and "down" and words of similar import as used herein are intended to apply only to the position of the parts as illustrated in the drawings, since it is well known that magnetic records of the general type illustrated may be mounted in many different positions, and frequently with magnetic recording surfaces and transducers on both sides thereof.

The link biasing spring 13 is a U-shaped member of suitable spring material, such as, for example, spring steel, with the base, or transverse portion 30 thereof of flat, cross sectional shape, and riding on the transverse rear portion 28 of the loop 11 as shown in FIG. 5. The forward edge 30*a* of this transverse spring portion 30 is fitted into a rabbeted extension 31 of the link mounting groove 29.

The side arms 32 of the U-shaped spring 13 are bent slightly downwardly relative to the transversely extending flat rear portion 30 thereof, as best shown in FIG. 3, and thus exert a downward bias on the forward portion of the loop 11 which tends to urge the transducer head 10 downwardly relative to the support member 12.

The support arm 15 for the support member 12 is of suitable material, such as, for example, spring bronze or spring steel, and is secured to the support member 12 as by screws 33 passing through openings provided therefor in the support arm 15 and screwed into threaded holes 34 provided therefor in the support member 12.

The arm 15 is so biased as to normally hold the support member 12 and the transducer 10 mounted therein in slightly spaced relation to a record B with which the transducer is to be used. Thus, when the record is at rest, or during starting and stopping of the record, there will be no danger of wearing contact between the support member with its transducer, and the record. When the record attains operating speed, however, sufficient to generate the air current 18 previously described herein, said air current, by its negative lifting effect on the support member 12 urges the latter, and the transducer 10 mounted therein into close, uniform operative juxtaposition with the record. At this time the air bearing effect of the portion 18*a* of the air current becomes effective to prevent actual contact with the record.

The forwardly extending tongue 14 of the support arm 15 bears on the flat transverse spring portion 30, and thus retains the spring 13, and the underlying transverse link portion 28, against displacement.

The operation of the invention as embodied in the assembly A is as follows:

The spring arm 15 is so arranged that when the record B is at rest, or is moving so slowly as not to produce an effective air current, the support member 12 and its transducer 10 are supported by the arm 15 slightly clear of the record B. With the record disk B rotating at a desired speed, however, and the drag-induced air current 18 moving at an effective rate as indicated by the arrows in FIG. 3, the lower portion 18*a* of this air current is drawn, by usual wedge action, between the flat under surface 20 of the support member 12 and the record surface 19, and also between the flat under surface 21 of the transducer head 10 and said record surface to provide air bearing support for the support member 12 and the transducer head 10.

The portion of the air current more remote from the disk B, and represented by the arrows 18*b* and 18*c*, flows over and around the wing section shaped support member 12, thereby exerting a lift effect on the support member in a direction to urge it toward the disk B. The lift effect on the support member induced by the more remote portion of the air current 18 increases with an increase in speed of the air current, as does also the effectiveness of the air bearing portion of this current.

Since, as explained previously herein, the transducer head 10 is mounted for independent tilting and up and down movement relative to the support member 12, the resilient force exerted by the spring arms 32 urges the transducer 10 downwardly into close, conforming, guided relation to the magnetic record face 19.

Figure 6:
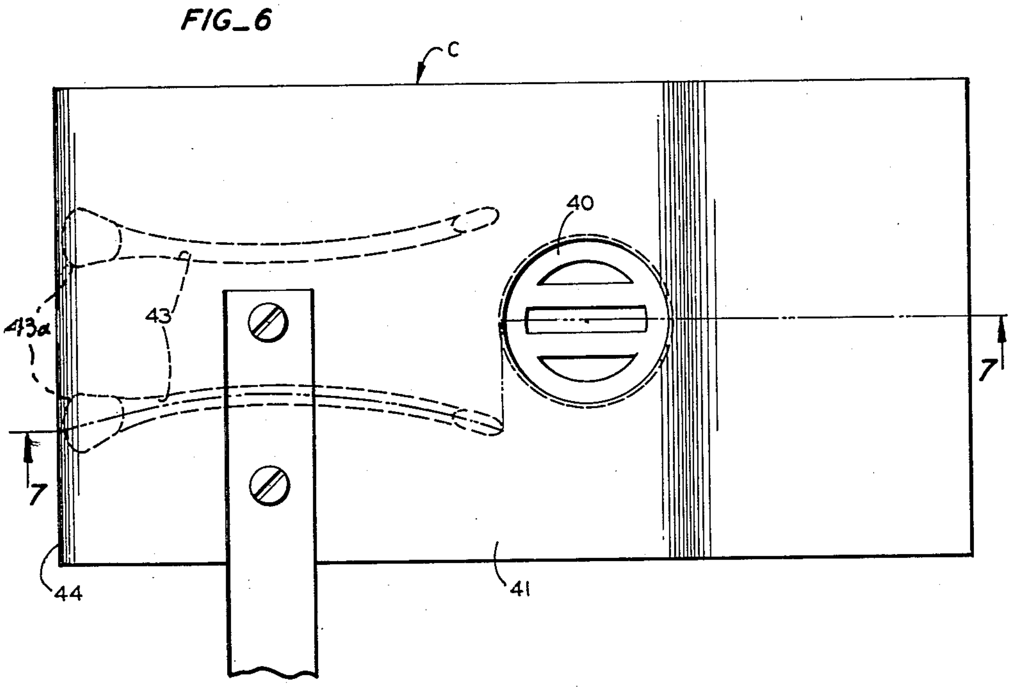
FIG. 6 is a plan view similar to FIG. 2, but showing a modified form of the invention.
Figure 7:
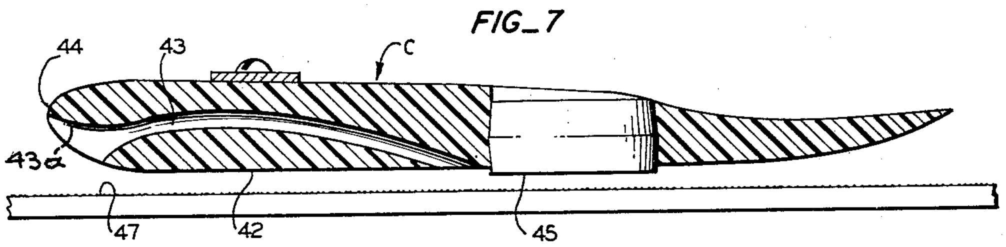
FIG. 7 is a sectional view taken along line 7—7 of FIG. 6.

In the modified form C of the invention shown in FIGS. 6 and 7, the transducer head 40 is fixedly mounted in a support member 41 of lift type wing section shape generally similar to the support member 12 of FIGS. 1–5. The transducer head 40 preferably projects slightly below the flat surface 42 of the support member 41. The amount of projection of the transducer is exaggerated in FIG. 7 for the purpose of illustrating this point. Actually, the transducer 40 preferably would project only of the order of .001" or less.

A pair of venturi air ducts 43 extends from the leading edge 44 of the support member 41, through the latter, and open at their rear ends through the under surface 42 of the support member adjacent the transducer head 40. Ram action on the enlarged forward ends 43*a* of these ducts induces a flow of air through them. This air is discharged closely alongside the transducer head 40, and thus, by its increased velocity and decreased pressure, produces a Bernoulli effect which tends to bring the flat under surface 45 of the transducer head still closer to the record surface 47 than if no such ducts were provided.

The invention provides for smooth, uniform, and practically friction-free support of a transducer head over a rotating record member, and one wherein a generous initial clearance between the transducer and the record when the latter is at rest, and during starting and stopping, will be reduced by the lift effect exerted toward the record by the air current 18 on the support member as the speed of the record increases the velocity of the air current 18 to an effective rate. At the same time the air bearing support is provided by the portion 18*a* of such current to prevent actual contact between the transducer and its support member with the record. A uniform or balanced minimum spacing of the transducer from the record when the latter is traveling at operative speeds is thus achieved, thereby permitting extremely high bit density on the record without distortion.

While I have illustrated and described a preferred embodiment of the present invention and a modified form thereof, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. Mechanism for supporting a transducer in slightly spaced relation to a uniform magnetic record surface moving at a speed sufficient to generate a laminar air current by air drag along such record surface, said mechanism comprising a support member of a size for mounting within such air current said support member being of aircraft wing shape, an under surface portion of the support member shaped to conform to such record surface, means for mounting a transducer on the support member with a portion of the transducer exposed through said conforming under surface portion of the support member, means supporting the support member with its leading edge directed into such air current for retaining the support member against relative movement in the direction of record travel, and movable toward and away from such record surface, whereby, such air current provides air bearing support for the support member and a transducer mounted thereon, the side of the support member nearest such record being so shaped, relative to the side opposite thereto, that a greater pressure will be exerted on the latter side than on the former side by the flow of such air currents around the support member, thereby urging the latter toward the record.

2. A transducer support member of aircraft wing shape, and of a size for mounting in an air current generated by a moving record surface, an under surface portion of the support member shaped to conform to a moving record surface with which the support member is adapted to be used, said support member having a hole therein of a size to receive a transducer freely therein, means resiliently urging a transducer mounted in said hole in the support member toward a record over which the support member is mounted, and resilient means mounting the support member with a transducer mounted in the hole therein in slightly spaced relation to such record and within such air current when generated by a movement of such record, the leading edge of the support member being directed into such air current, and the side of the support member nearest such record being so shaped, relative to the side opposite thereto, that a greater pressure will be exerted on the latter side than on the former side by the flow of such air currents around the support member.

3. A transducer support member of aircraft wing shape, and of a size for mounting in an air current generated by a moving record surface, an under surface portion of the support member shaped to conform to a moving record surface with which the support member is adapted to be used, said support member having a hole therein of a size to receive a transducer freely therein, a link member pivotally mounted on the support member and with its ends adjacent such hole and separated for receiving a transducer pivotally therebetween, means resiliently biasing said link in a direction to urge a transducer pivotally mounted between said link ends and in said hole in the support member toward a moving record surface over which the support member is mounted, and means for mounting the support member with a transducer mounted in the hole therein in such air current, and with the leading edge of the support member directed into such air current, the support member being mounted at an angle of incidence thereto to provide greater air pressure on the side of the support member farthest from such record surface than on the side nearest thereto, thereby urging the support member toward such record surface.

4. A transducer support member of aircraft wing shape, and of a size for mounting within an air current generated by a moving record surface, an under surface portion of the support member shaped to conform to the recording surface of a magnetic record with which the support member is adapted to be used, said support member having a hole therein opening into said under surface portion, a transducer mounted in said hole, means acting between the support member and the transducer for resiliently urging a transducer mounted in said hole in the support member toward a moving record surface over which the support member is mounted, and means for mounting the support member with a transducer mounted in the hole therein in such air current, and with the leading edge of the latter directed into such air current, the support member being mounted at an angle of incidence thereto to provide a greater air pressure on the side of the support member farthest from such record surface and on the side nearest thereto, thereby urging the support member toward such record surface.

5. Mechanism for supporting a transducer in uniformly, slightly spaced relation to a flat recording surface of a rotary magnetic record rotating at sufficient speed to generate an air current across its face, said mechanism comprising a support member of aircraft wing shape adapted to be superposed on such rotating record, within, and with its leading edge directed into, such air current, said support member having a flat under surface portion shaped to conform to a flat recording surface of such record, a transducer head having a flat under surface mounted in said support member with its flat under surface substantially coincident with the flat under surface portion of said support member, and resilient means for mounting said support member against longitudinal movement within such air current and biased to normally space the support member and the transducer mounted therein in slightly spaced relation to such record and within such air current, whereby a portion of such air current closely adjacent the record surface is drawn, by the rotation of such record, between such record surface and the under surfaces of the support member and of the transducer, thereby to provide air bearing support for the support member and transducer, the two sides of the support member being so curved, and the support member being mounted at such an angle of incidence relative to such record surface, that the remaining portion of such air current within which said support member lies exerts a lift effect on the support member urging the latter against the bias of its mounting means toward such record surface.

6. Mechanism for supporting a transducer in uniformly, slightly spaced relation to a smooth, uniform recording surface of a magnetic record moving at sufficient speed to generate an air current across its face, said mechanism comprising a support member of aircraft wing shape adapted to be superposed on such moving record, within, and with its leading edge directed into, such air current, said support member having an under surface portion shaped to conform with a recording surface of such record, means for mounting a transducer head in said support member with its under surface substantially coincident with said under surface portion of said support member, and means for retaining said support member against longitudinal movement, and free for movement toward and away from such record, whereby a portion of such air current closely adjacent the record surface of such moving record is drawn between such record surface and the under surface of the support member to provide air bearing support for the latter, the support member being positioned at such an angle of incidence relative to such air stream that the remaining portion of such air current within which said support member lies exerts a lift effect on the support member urging the latter toward a recording surface of such record.

7. A transducer support member of aircraft wing shape adapted to be superposed on a moving magnetic record within, and with its leading edge directed into an air current generated by air drag on such moving record, said support member having an under surface portion shaped to conform with a recording surface of such record, means for mounting a transducer head with its under surface substantially coincident with the shaped, record conforming under surface portion of said support member, and means mounting said support member against longitudinal movement, while normally biasing the support member to slightly spaced relation with such record, and within such air current, whereby a portion of such air current closely adjacent such recording surface is drawn by the movement of such record between such recording surface and the under surface of the support member to provide air bearing support therefor, the under side of the support member having a greater camber than the upper side thereof so that the remaining portion of such air current flowing around said support member exerts a lift effect on the support member urging the latter against the bias of said mounting means toward such record.

8. A transducer support member of aircraft wing shape, and of a size for mounting within the laminar air current generated by the movement of a record surface, the support member being so shaped and positioned that the air pressure exerted thereon by its movement relative to such air current is greater on its outer than on its under side relative to such record surface, an under surface portion of the support member shaped to conform to the recording surface of a magnetic record with which the support member is adapted to be used, and resilient means for mounting the support member in normally slightly spaced relation to such record, and within such laminar air current, and with its leading edge directed into such air current.

9. A transducer support member of aircraft wing shape, and of a size for mounting within the laminar air current generated by the movement of a record surface, the support member being so shaped and positioned that the air pressure exerted thereon by its movement relative to such air current is greater on its outer than on its under side relative to such record surface, an under surface portion of the support member shaped to conform to the recording surface of a magnetic record with which the support member is adapted to be used, a passage communicating between the leading edge of such support member and said record-conforming under surface, and means resiliently supporting the support member in normally slightly spaced relation to such record, whereby said support member is adapted to lie within such air current, and with its leading edge directed into such air current, thereby to be urged toward such record surface by the difference in pressure upon its outer and under sides relative to such record surface generated by a movement of the support member relative to such air current.

10. A transducer support member of aircraft wing shape, and of a size for mounting within the laminar air current generated by the movement of a record surface, the support member being so shaped and positioned that the air pressure exerted thereon by its movement relative to such air current is greater on its outer than on its under side relative to such record surface, an under surface portion of the support member shaped to conform to the recording surface of a magnetic record with which the support member is adapted to be used, a transducer mounted within said support member and substantially flush with said under surface portion of the support member, an air passage with an enlarged forward end opening communicating from the leading edge of said support member through said conforming under surface portion thereof alongside a transducer mounted in said support member, and means mounting the support member with the transducer therein in such air current, and with the leading edge of the support member and the enlarged forward end of said passage directed into such air current, whereby a stream of air is forced through such passage and the support member is urged toward such record surface by the difference in pressure on its outer and under sides relative to such record surface generated by the movement of the support member relative to such air current.

11. An arrangement according to claim 10 where one of said passages is provided on each side of such transducer.

12. A transducer support member of a size for mounting within a laminar air current generated by the movement of a record surface, said support member being of aircraft wing shape and mounted with its leading edge directed into such air current, said support member having a greater camber on the side thereof toward such record than on the other side thereof for exerting a lift effect toward such record when so mounted, and being positioned at such an angle of incidence to such air stream as to urge the support member by such lift effect toward a record surface generating such air stream.

13. A transducer support member of a size for mounting within a laminar air current generated by the movement of a record surface, a surface portion of the support member shaped to conform to such record surface, thereby to provide air bearing support in such air current for the support member, said support member being of aircraft wing shape and mounted with its leading edge directed into such air current, said support member being so cambered on its opposite sides, and positioned at such an angle of incidence to such air stream, as to exert a lift effect urging the support member toward a record surface generating such air stream.

14. A transducer support member of a size for mounting within a laminar air current generated by the movement of a record surface, said support member being of aircraft wing shape and mounted with its leading edge directed into such air current, said support member being so cambered on its opposite sides, and positioned at such an angle of incidence to such air stream, as to exert a lift effect urging the support member toward a record surface generating such air stream, and a transducer operably mounted in said support member and flush with a surface on the support member nearest to such record surface.

References Cited in the file of this patent

UNITED STATES PATENTS

| | | |
|---|---|---|
| 2,772,135 | Hollabaugh et al. | Nov. 27, 1956 |
| 2,862,781 | Baumeister | Dec. 2, 1958 |
| 2,972,738 | Sliter | Feb. 21, 1961 |

OTHER REFERENCES

Webster's Collegiate Dictionary, copyright 1956, Div. 16 (page 20).